(12) United States Patent
Choi et al.

(10) Patent No.: US 10,983,080 B2
(45) Date of Patent: Apr. 20, 2021

(54) APPARATUS FOR QUANTITATIVELY FEEDING A HIGH VISCOSITY FLUID SAMPLE

(71) Applicant: KOREA BASIC SCIENCE INSTITUTE, Daejeon (KR)

(72) Inventors: Yeon Suk Choi, Daejeon (KR); Soo Yeol Jeong, Anyang-si (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 225 days.

(21) Appl. No.: 16/161,999

(22) Filed: Oct. 16, 2018

(65) Prior Publication Data
US 2019/0120778 A1  Apr. 25, 2019

(30) Foreign Application Priority Data
Oct. 19, 2017  (KR) .................. 10-2017-0135850

(51) Int. Cl.
| G01N 1/42 | (2006.01) |
| B26F 1/40 | (2006.01) |
| B26F 1/44 | (2006.01) |
| G01N 25/48 | (2006.01) |
| B01L 3/00 | (2006.01) |
| B26D 1/00 | (2006.01) |
| G01N 1/28 | (2006.01) |
| B01L 3/02 | (2006.01) |
| G01N 25/18 | (2006.01) |
| G01K 17/00 | (2006.01) |

(52) U.S. Cl.
CPC .......... *G01N 25/486* (2013.01); *B01L 3/0293* (2013.01); *B01L 3/508* (2013.01); *B26D 1/00* (2013.01); *G01N 1/286* (2013.01); *B01L 2300/1894* (2013.01); *B01L 2400/0478* (2013.01); *G01K 17/003* (2013.01); *G01N 1/42* (2013.01); *G01N 25/18* (2013.01); *G01N 25/4866* (2013.01); *G01N 2001/2873* (2013.01)

(58) Field of Classification Search
CPC ... B05D 1/26; B05D 5/12; B05D 7/00; B26D 5/26; A22C 17/00; B01L 3/00; G01N 25/18; G01N 25/48
See application file for complete search history.

(56) References Cited

U.S. PATENT DOCUMENTS 4,878,377 A * 11/1989 Abel ............... G01N 11/14
73/54.32
4,981,554 A * 1/1991 Loconsolo ............ B01D 1/225
159/6.1
(Continued)

FOREIGN PATENT DOCUMENTS

| JP | 05329431 | 12/1993 |
| JP | 09099983 | 4/1997 |

(Continued)

*Primary Examiner* — Brandi N Hopkins
(74) *Attorney, Agent, or Firm* — Hodgson Russ LLP

(57) ABSTRACT

Disclosed is an apparatus for quantitively supplying a high-viscosity fluid sample, the apparatus including a cylinder body in which a high-viscosity fluid is to be stored, a cylinder head detachably attached to the cylinder body, a piston configured to slide in a longitudinal direction of the cylinder body, and a cutter disposed below the cylinder head and configured to cut a high-viscosity fluid discharged from the cylinder head.

14 Claims, 9 Drawing Sheets

(56) References Cited

U.S. PATENT DOCUMENTS

| | | | | | |
|---|---|---|---|---|---|
| 5,763,766 | A | * | 6/1998 | Robinson | G01N 11/14 |
| | | | | | 73/54.33 |
| 8,813,542 | B1 | * | 8/2014 | Bi | G01N 11/14 |
| | | | | | 73/54.28 |
| 2001/0037673 | A1 | * | 11/2001 | Jackson | G01N 11/10 |
| | | | | | 73/54.23 |
| 2016/0091404 | A1 | * | 3/2016 | Flock | G01N 11/02 |
| | | | | | 134/8 |

FOREIGN PATENT DOCUMENTS

| | | |
|---|---|---|
| JP | 2006314859 | 11/2006 |
| KP | 61262618 | 11/1986 |
| KR | 20090070634 | 7/2009 |

* cited by examiner

APPARATUS FOR QUANTITATIVELY FEEDING A HIGH VISCOSITY FLUID SAMPLE

CROSS-REFERENCE TO RELATED APPLICATION(S)

This application claims the priority benefit of Korean Patent Application No. 10-2017-0135850 filed on Oct. 19, 2017, in the Korean Intellectual Property Office, the entire disclosure of which is incorporated herein by reference.

BACKGROUND

1. Field

One or more example embodiments relate to an apparatus for quantitively supplying a high-viscosity fluid sample.

2. Description of Related Art

Various methods are used to measure a thermal diffusivity of a material. In particular, a typical method for measuring the thermal diffusivity of a high-viscosity fluid is to inject the high-viscosity fluid into a sample holder and then measure a signal from a top surface by applying a pulsed laser to a bottom surface. Based on information about known materials, the thermal diffusivity of remaining materials, that is, the high-viscosity fluid may be calculated.

The sample holder may include a crucible, a wall, and a cover. A user may inject the high-viscosity fluid into the crucible, attaches the wall, and finally lay the cover. In this instance, a correct amount of high-viscosity material may be injected into the sample holder to obtain desired data. Precise control of the amount of fluid injected into the sample holder may be a significant factor for achieving a reliability when measuring the thermal diffusivity.

SUMMARY

An aspect is to increase a measurement reliability by accurately controlling an amount of high-viscosity fluid to be injected when preparing a sample for measuring a thermal diffusivity of a high-viscosity fluid sample.

Another aspect also provides an apparatus for supplying a high-viscosity fluid sample by cutting the high-viscosity fluid sample in a desired shape so as to be injected to a sample holder.

According to an aspect, there is provided an apparatus for quantitively supplying a high-viscosity fluid sample, the apparatus including a cylinder body in which a high-viscosity fluid is to be stored, a cylinder head detachably attached to the cylinder body, a piston configured to slide in a longitudinal direction of the cylinder body, and a cutter disposed below the cylinder head and configured to cut a high-viscosity fluid discharged from the cylinder head.

The cutter may include a plurality of blades configured to cut the high-viscosity fluid in a direction orthogonal to a direction in which the high-viscosity fluid is discharged and an operation lever configured to operate the plurality of blades.

The plurality of blades may be configured to approach a central axis of the cylinder head while rotating about the central axis.

The apparatus may further include support columns disposed on both sides of the cylinder body and fixers penetrating the support columns to fix the cylinder body by pressing both sides of the cylinder body.

Each of the support columns may include a guide formed in a direction perpendicular to a ground, and the fixers may each be configured to slide along the guide.

The cutter may be disposed below the cylinder head, and the cylinder head may be configured to move downward to reach the cutter.

The cylinder body may include a first portion having a columnar shape and including two planar portions facing each other, and a second portion having a cylindrical shape and being connected to the first portion.

The second portion and the cylinder head may be threadedly engageable with each other.

The piston may include an indicator configured to indicate an amount of high-viscosity fluid in the cylinder body.

The apparatus may further include a cooler configured to cool the high-viscosity fluid discharged from the cylinder head.

The cooler may include a cooling box disposed between the cylinder head and the cutter.

The cooler may include a cooling hose configured to enclose the cylinder head.

According to another aspect, there is also provided an apparatus for quantitively supplying a high-viscosity fluid sample, the apparatus including a cylinder body in which a high-viscosity fluid is to be stored, a cylinder head detachably attached to the cylinder body, a piston configured to slide in a longitudinal direction of the cylinder body, and a cooler disposed below the cylinder head and configured to cool a high-viscosity fluid discharged from the cylinder head.

The cooler may include a cooling box disposed between the cylinder head and the cutter.

The cooler may include a cooling hose configured to enclose the cylinder head.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
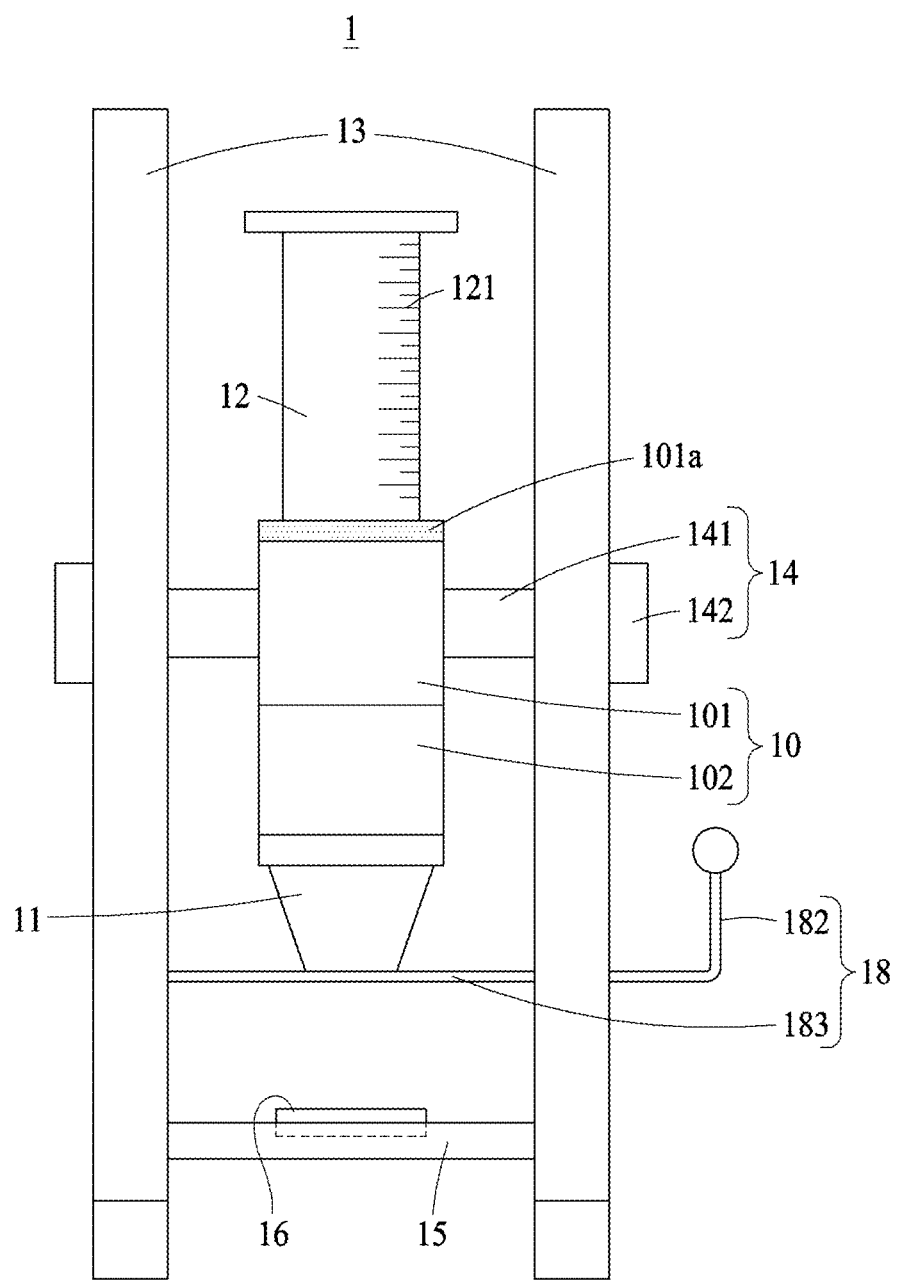
FIG. 1 is a front view illustrating an apparatus for quantitively supplying a fluid sample according to an example embodiment.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

A component described in any one of the example embodiments and a component including a common function or feature will be described using the same names in other example embodiments. Unless otherwise stated, the description in any one of the example embodiments may be applicable to other example embodiments, and a detailed description will be omitted in an overlapping range.

Figure 2:
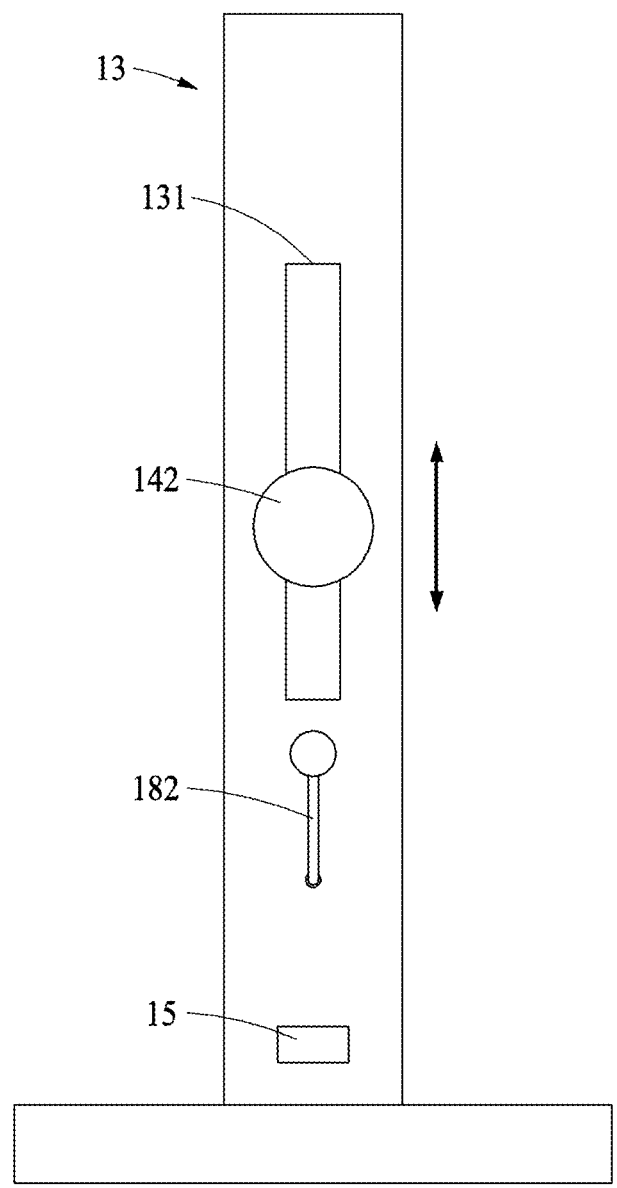
FIG. 2 is a side view illustrating an apparatus for quantitively supplying a fluid sample according to an example embodiment.

FIG. 1 is a front view illustrating an apparatus for quantitively supplying a fluid sample according to an example embodiment and FIG. 2 is a side view illustrating an apparatus for quantitively supplying a fluid sample according to an example embodiment.

Referring to FIGS. 1 and 2, an apparatus 1 for quantitively supplying a high-viscosity fluid sample may quantitively feed the a high-viscosity fluid sample into a sample holder 16 disposed on a shelf 15 to increase an accuracy on measuring a thermal diffusivity of a material. The apparatus 1 may include a cylinder body 10, a cylinder head 11, a piston 12, support columns 13, fixers 14, and a cutter 18. The shelf 15 may be provided in a lower end portion of the apparatus 1. The sample holder 16 may be disposed on the shelf 15.

The cylinder body 10 may store a high-viscosity fluid sample in an internal hollow space. An inner surface of the cylinder body 10 may be coated so that the high-viscosity fluid sample does not adhere thereto. The cylinder body 10 may be formed of a transparent or a semitransparent material for observing a fluid from the outside. When the cylinder body 10 is attached to the support columns 13, the cylinder body 10 may include a first portion 101 at an upper side and a second portion 102 at a lower side. The cylinder body 10 may be formed of a metal material for ease of cleaning.

The piston 12 may be slidably attached to the first portion 101. For example, when the cylinder body 10 is attached to the support columns 13, the first portion 101 may be opened toward an upper position and the piston 12 may be inserted into the open portion. An elastic body 101a may be provided at the open portion to prevent a separation of the piston 12. The elastic body 101a may realize a seal between the cylinder body 10 and the piston 12 and prevent a fluid in the first portion 101 from being discharged upward. Sides of the first portion 101 may be supported by the fixers 14.

The cylinder head 11 may be attached to the second portion 102. For example, when the cylinder body 10 is attached to the support columns 13, the second portion 102 may be opened toward a lower position and the cylinder head 11 may be inserted into the open portion. The second portion 102 and the cylinder head 11 may be threadedly engaged to each other.

The cylinder head 11 may be detachably attached to the cylinder body 10. A user may easily inject a high-viscosity fluid into the cylinder body 10 when the cylinder head 11 is detached. After the high-viscosity fluid is injected, the cylinder head 11 may be attached to the cylinder body 10. For example, the cylinder body 10 and the cylinder head 11 may have screw threads to be engaged with each other. The cylinder head 11 may be formed on a metal material for ease of cleaning.

The piston 12 may be detachably attached to the cylinder body 10. For example, the cylinder body 10 may be easily cleaned by separating the piston 12. The piston 12 may close the upper open portion of the cylinder body 10. A vertical movement of the piston 12 may be restricted by the elastic body 101a of the first portion of the cylinder body 10. The piston 12 may move in a vertical direction relative to the cylinder body 10, thereby pushing out the high-viscosity fluid stored in the cylinder body 10 to the outside. The piston 12 may include an indicator 121 to indicate an amount of high-viscosity fluid in the cylinder body 10.

The support columns 13 may be disposed on both sides of the cylinder body 10. The support columns 13 may guide the cylinder body 10 to move in a vertical direction. For example, the support columns 13 may be respectively disposed on a left side and a right side of the cylinder body 10. The support columns 13 may each include a guide 131 to guide the cylinder body 10 to move in the vertical direction. For example, the guide 131 may be formed in a longitudinal direction.

The fixers 14 may penetrate the support columns 13 and fix the cylinder body 10 by pressing both sides of the cylinder body 10. The fixers 14 may prevent the cylinder body 10 from shaking. The fixers 14 may slide along the guide 131 of the support columns 13. For example, the fixer 14 may include a contactor 141 to contact the cylinder body 10 and an adjuster 142 to adjust a horizontal sliding length of the contactor 141.

Figure 6A:
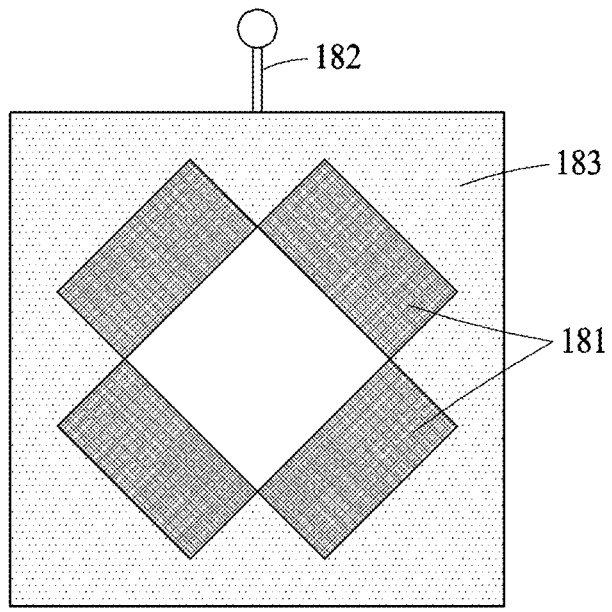
FIG. 6A is a top view illustrating a cutter being opened according to an example embodiment.

The cutter 18 may cut the high-viscosity fluid discharged from the cylinder head 11. The high-viscosity fluid may be cut by the cutter 18 such that a desired amount of high-viscosity fluid is injected into the sample holder 16. The cutter 18 may be disposed below the cylinder head 11. The cylinder head 11 and the cylinder body 10 may slide in the vertical direction. The cylinder head 11 may move downward to reach the cutter 18. When the cutter 18 is in contact with a bottom of the cylinder head 11, a user may precisely control a discharged amount of the high-viscosity fluid. The cutter 18 may include a plurality of blades 181 as shown in FIG. 6A, a lever 182, and a blade support 183.

Figure 3:
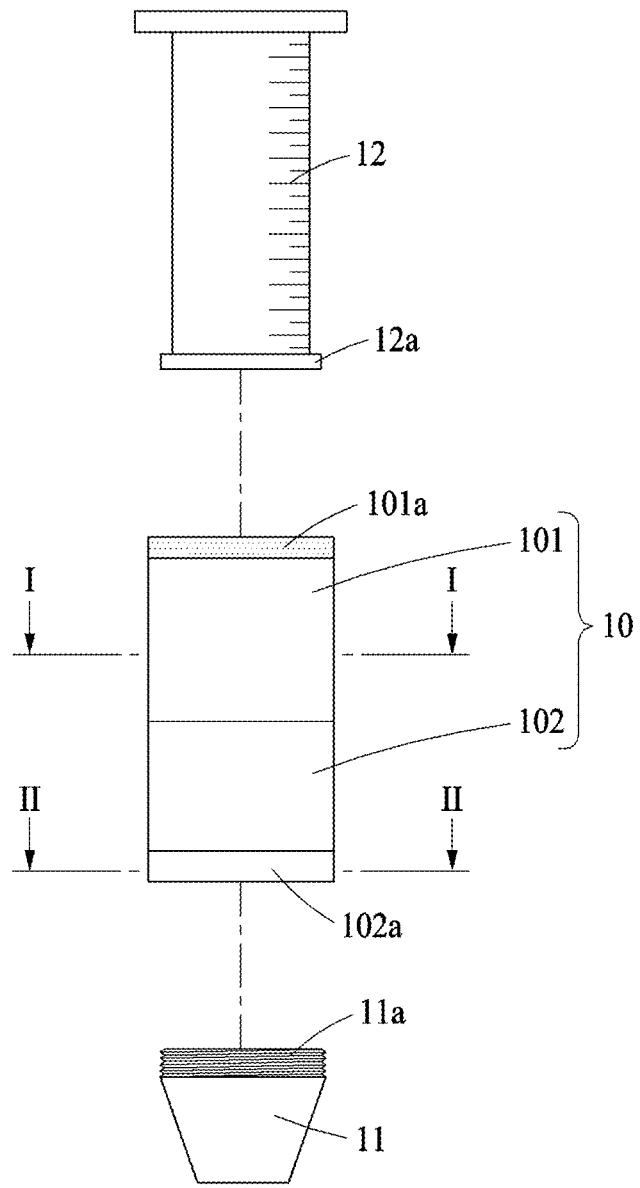
FIG. 3 is an exploded view illustrating a cylinder body, a cylinder head, and a piston according to an example embodiment.
Figure 4:
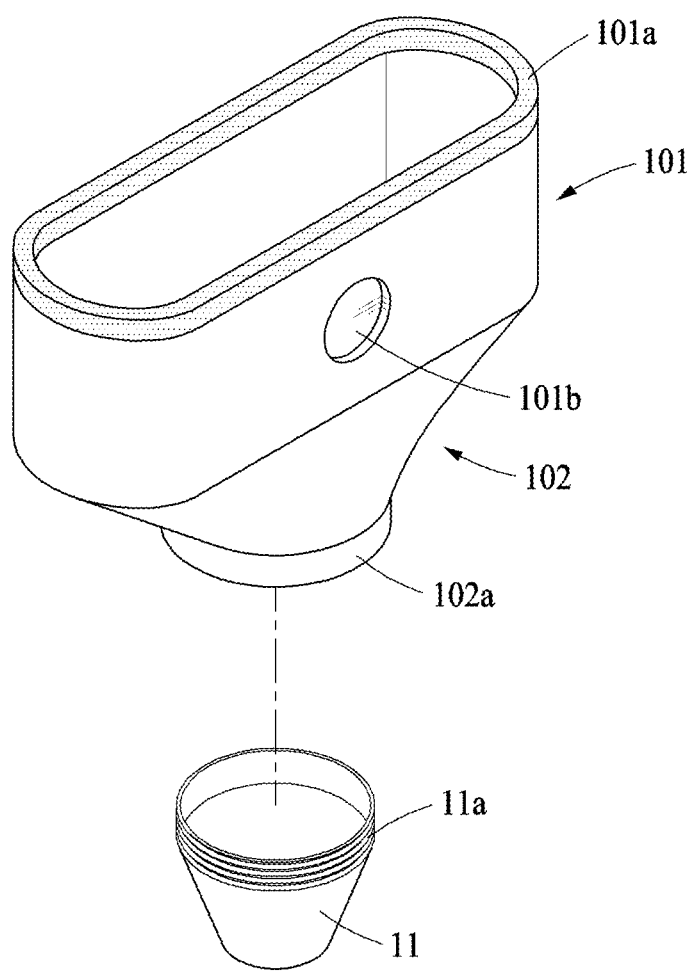
FIG. 4 is an exploded view illustrating a cylinder body and a cylinder head according to an example embodiment.
Figure 5:
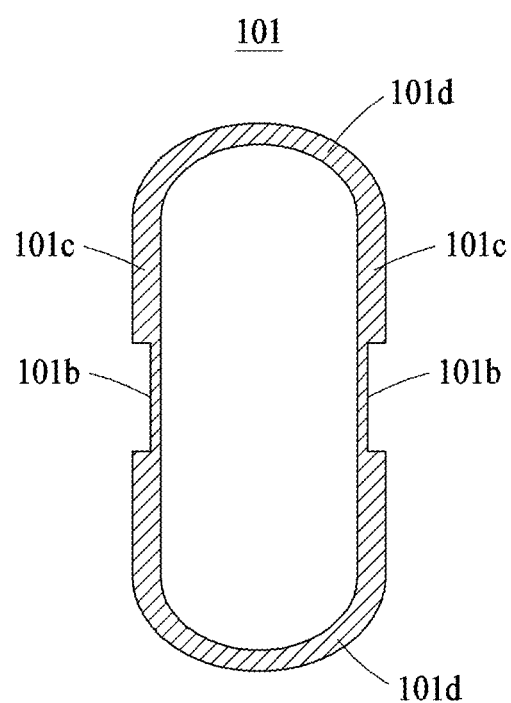
FIG. 5 is a cross-sectional view illustrating a first portion of a cylinder body according to an example embodiment.

FIG. 3 is an exploded view illustrating a cylinder body, a cylinder head, and a piston according to an example embodiment, FIG. 4 is an exploded view illustrating a cylinder body and a cylinder head according to an example embodiment, and FIG. 5 is a cross-sectional view illustrating a first portion of a cylinder body according to an example embodiment.

Referring to FIGS. 3 through 5, the piston 12 and the cylinder body 10 may be detachably attached to each other. The piston 12 may be, for example, in a columnar shape with an extended end portion. An extended end portion 12a may be blocked by the elastic body 101a of the cylinder body 10 so as to be prevented from being separated. The extended end portion 12a may have a shape in contact with an inner circumferential face of the cylinder body 10. The extended end portion 12a may push out a high-viscosity fluid stored in the cylinder body 10.

The cylinder head 11 and the cylinder body 10 may be detachably attached to each other. In one example, the cylinder head 11 and the cylinder body 10 may have screw threads to be threadedly engaged to each other. For example, the cylinder head 11 may be coupled with the cylinder body 10 through an insertion into the cylinder body 10. One end portion of the cylinder head 11 may have a screw thread on an outer face and one end of the cylinder body 10 may have a screw thread on an inner face. In another example, although not shown, the cylinder head 11 may be coupled with the cylinder body 10 by enclosing the outer face of the cylinder body 10.

The cylinder body 10 may include the first portion 101 and the second portion 102.

The first portion 101 may have a columnar shape and include two planar portions facing each other. For example, the first portion 101 may have two planar portions 101c and two curved portions 101d connecting the two planar portions 101c.

A fixing hole 101b may receive one end portion of the fixer 14. The fixing hole 101b may be formed on each of the two planar portions 101c. The fixing holes 101b may be formed at positions facing each other.

The second portion 102 may have a cylindrical shape to couple the first portion 101 including the two planar portions 101c facing each other with the cylinder head 11. The second portion 102 may be connected to a lower side of the first portion 101. The second portion 102 may have a shape that becomes narrower in a direction from the first portion 101 to a lower position. An end portion 102a of the second portion 102 may have a cylindrical shape. The end portion 102a of the second portion 102 may have an inner face on which a screw thread is formed so as to be threadedly engaged to the end portion 11a of the cylinder head 11.

Figure 6B:
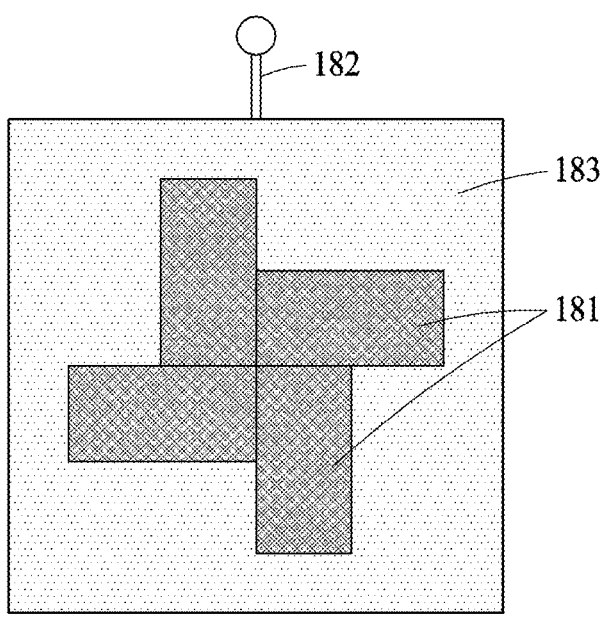
FIG. 6B is a top view illustrating a cutter being closed according to an example embodiment.

FIG. 6A is a top view illustrating a cutter being opened according to an example embodiment and FIG. 6B is a top view illustrating a cutter being closed according to an example embodiment.

Referring to FIGS. 6A and 6B, the cutter 18 may include the plurality of blades 181, the lever 182, and the blade support 183.

The plurality of blades 181 may cut a high-viscosity fluid in a direction orthogonal to a direction in which the high-viscosity fluid is discharged. The plurality of blades 181 may slide on the blade support 183. For example, the plurality of blades 181 may be slid between an open position and a close position as shown in FIGS. 6A and 6B. When the plurality of blades 181 is at the open position, the high-viscosity fluid may pass through a space surrounded by the plurality of blades 181. In other words, the plurality of blades 181 may cut the high-viscosity fluid in multiple directions. As illustrated in FIGS. 6A and 6B, the plurality of blades 181 may be four blades to cut the high-viscosity fluid in four directions. As such, by cutting the high-viscosity fluid in the multiple directions, the plurality of blades 181 may prevent the fluid being not smoothly cut due to the viscosity or prevent the fluid from slantly flowing in one direction, which may lead to a deformation.

The plurality of blades 181 may approach a central axis of the cylinder head 11 while rotating about the central axis. The plurality of blades 181 may perform a rotational motion and a translational motion about the center axis of the cylinder head 11, thereby efficiently cutting the high-viscosity fluid.

The lever 182 may be used to operate the plurality of blades 181. For example, when the lever 182 is turned in a clockwise direction, the plurality of blades 181 may be gathered inwardly. Also, when the lever 182 is turned in a counterclockwise direction, the plurality of blades 181 may be spaced apart from one another.

The blade support 183 may support the plurality of blades 181. The blade support 183 may be detachably attached to lower portions of the support columns 13.

Figure 7A:
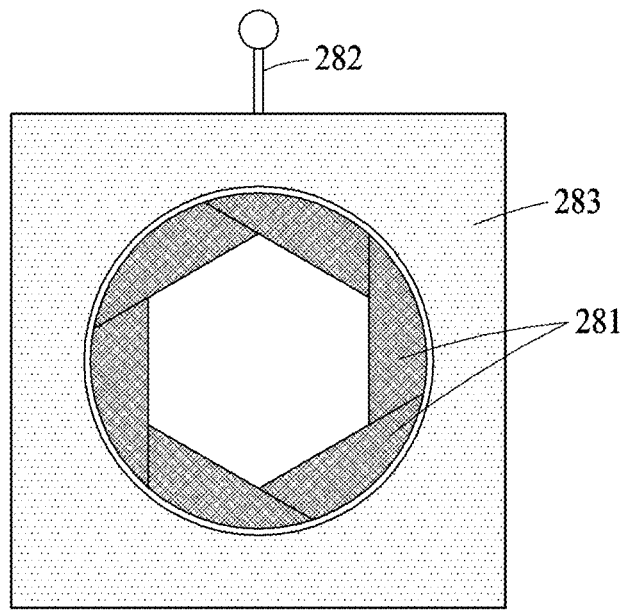
FIG. 7A is a top view illustrating a cutter being opened according to an example embodiment.
Figure 7B:
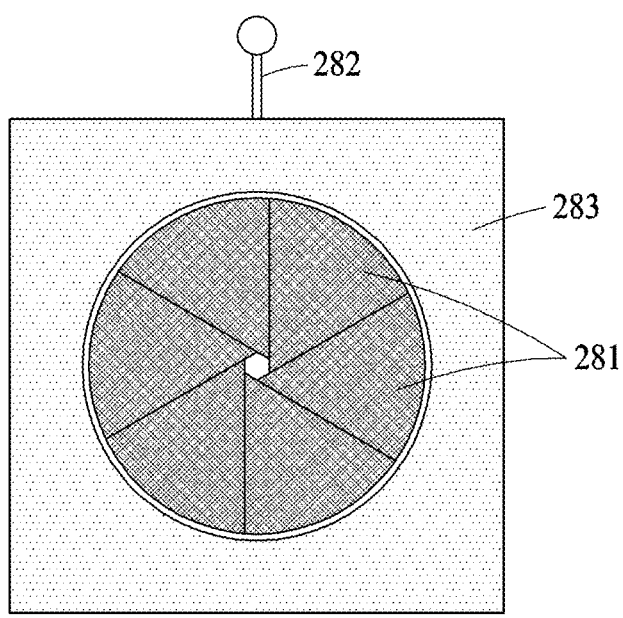
FIG. 7B is a top view illustrating a cutter being closed according to an example embodiment.

FIG. 7A is a top view illustrating a cutter being opened according to an example embodiment and FIG. 7B is a top view illustrating a cutter being closed according to an example embodiment.

Referring to FIGS. 7A and 7B, a cutter 28 may include a plurality of blades 281, a lever 282, and a blade support 283.

The blade support 283 have a receiving space therein. When the plurality of blades 281 is at an open position as shown in FIG. 7A, the plurality of blades 281 may be inserted into the blade support 283.

The plurality of blades 281 may be an iris diaphragm type and slid between the open position and the closed position as illustrated in FIGS. 7A and 7B. The plurality of blades 281 may approach a center of the high-viscosity fluid while sliding along a circumference of the high-viscosity fluid. Through this, the plurality of blades 281 may effectively cut the high-viscosity fluid.

Figure 8:
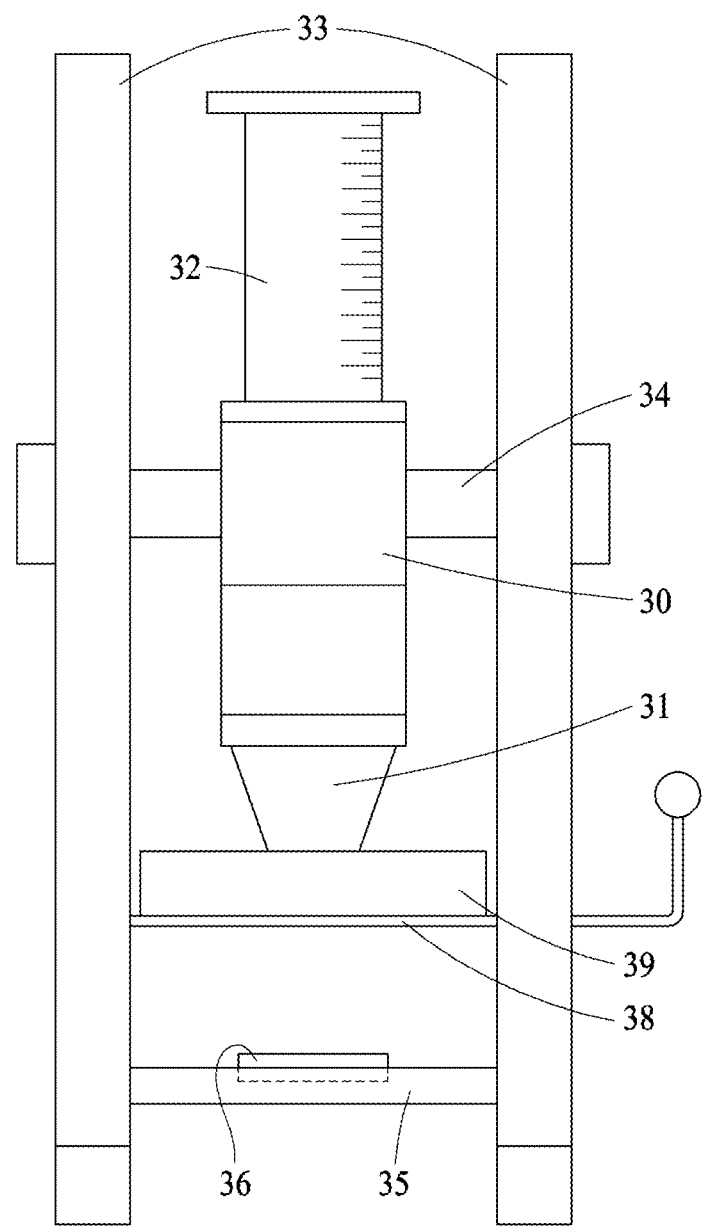
FIG. 8 is a front view illustrating an apparatus for quantitively supplying a fluid sample according to an example embodiment.

FIG. 8 is a front view illustrating an apparatus for quantitively supplying a fluid sample according to an example embodiment.

Referring to FIG. 8, an apparatus 3 for quantitively supplying a high-viscosity fluid sample may quantitively feed the a high-viscosity fluid sample into a sample holder 36 disposed on a shelf 35 to increase an accuracy on measuring a thermal diffusivity of a material. The apparatus 3 may include a cylinder body 30, a cylinder head 31, a piston 32, support columns 33, fixers 34, a cutter 18, and a cooler 39.

The cooler 39 may be disposed below the cylinder head 31 and cool the high-viscosity fluid discharged from the cylinder head 31. The cooler 39 may be used to harden the fluid so as to be more effectively cut. The cooler 39 may include a cooling box containing a refrigerant. The cooling box may be disposed between the cylinder head 31 and the cutter 38. The cooling box may be detachably attached to the support columns 33. The cooler 39 may accommodate liquid nitrogen. The cooler 39 may be disposed below the cylinder head 31. The cooler 39 may be disposed between the cylinder head 31 and the cutter 38 to harden the high-viscosity fluid before the high-viscosity fluid is cut by the cutter 38.

A user may push the piston 32 downwardly such that the high-viscosity fluid is discharged from the cylinder body 30. The discharged high-viscosity fluid may be hardened by the cooler 39. For example, the high-viscosity fluid may be hardened in the cooler 39 containing a refrigerant. The cooler 39 may be, for example, an annular cooling box containing the refrigerant. When the high-viscosity fluid is sufficiently cooled, the user may separate the cooler 39 from the support columns 33. Thereafter, the user may slide the fixers 34 downwardly such that the cylinder head 31 and the cutter 18 are in contact with each other.

Figure 9:
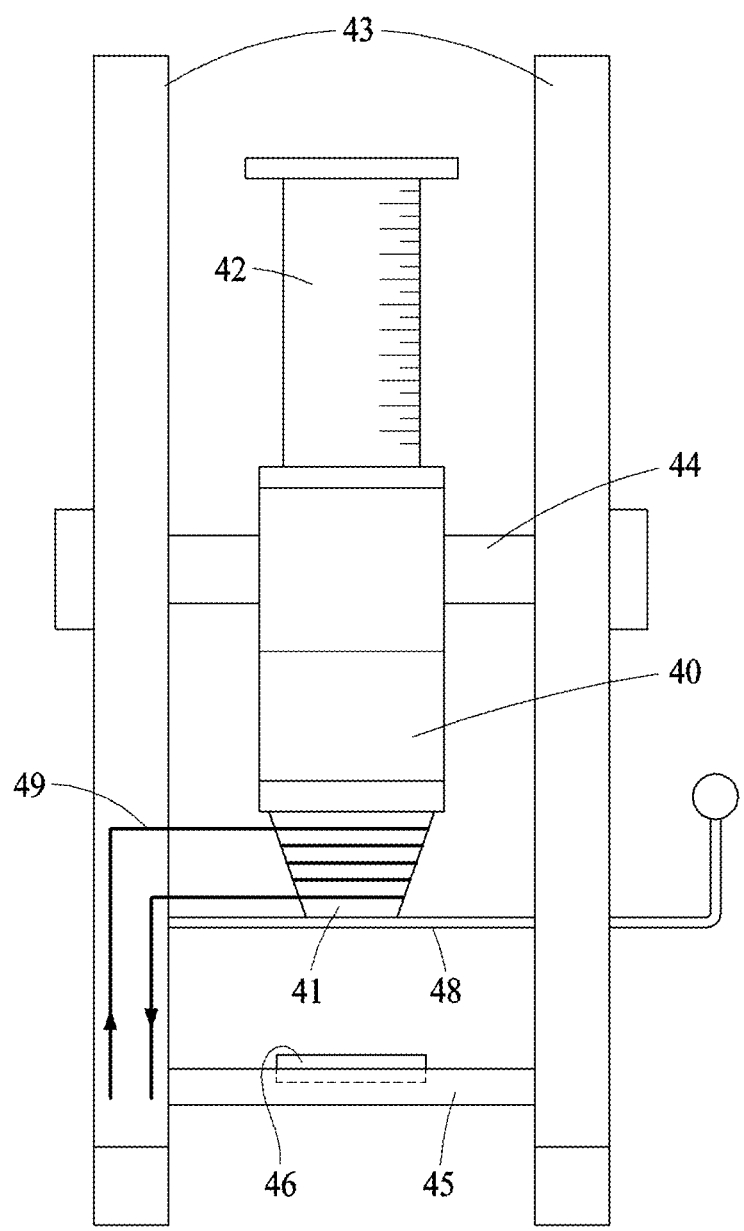
FIG. 9 is a front view illustrating an apparatus for quantitively supplying a fluid sample according to an example embodiment.

FIG. 9 is a front view illustrating an apparatus for quantitively supplying a fluid sample according to an example embodiment.

Referring to FIG. 9, an apparatus 4 for quantitively supplying a high-viscosity fluid sample may quantitively feed the a high-viscosity fluid sample into a sample holder 46 disposed on a shelf 45 to increase an accuracy on measuring a thermal diffusivity of a material. The apparatus 4 may include a cylinder body 40, a cylinder head 41, a piston 42, support columns 43, fixers 44, a cutter 48, and a cooler 49.

The cooler 49 may include a cooling hose that encloses the cylinder head 41. The cooler 49 may allow a refrigerant to flow along an outer circumferential surface of the cylinder head 41, thereby curing the high-viscosity fluid temporarily stored in the cylinder head 41. The hardened fluid may be effectively cut by the cutter 48. A user may slide the cylinder head 41 downwardly and fix the cylinder head 41 such that the cylinder head 41 and the cutter 48 are in contact with each other. Through this, the user may allow a desired amount of high-viscosity fluid to be discharged. Thereafter, the user may cut the high-viscosity fluid using the cutter 48.

According to example embodiments, it is possible to improve a thermal diffusivity measurement reliability by accurately controlling an amount of high-viscosity fluid to be provided to a sample holder.

According to example embodiments, it is possible to provide an iris-type cutter and a high-viscosity fluid sample cooler to cut a high-viscosity fluid sample in a desired shape and inject the high-viscosity fluid sample to a sample holder.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for quantitively supplying a high-viscosity fluid sample, the apparatus comprising:
   a cylinder body in which a high-viscosity fluid is to be stored;
   a cylinder head detachably attached to the cylinder body;
   a piston configured to slide in a longitudinal direction of the cylinder body;
   a cutter disposed below the cylinder head and configured to cut a high-viscosity fluid discharged from the cylinder head; and
   a cooler configured to cool the high-viscosity fluid discharged from the cylinder head.

2. The apparatus of claim 1, wherein the cutter comprises:
   a plurality of blades configured to cut the high-viscosity fluid in a direction orthogonal to a direction in which the high-viscosity fluid is discharged; and
   an operation lever configured to operate the plurality of blades.

3. The apparatus of claim 2, wherein the plurality of blades is configured to approach a central axis of the cylinder head while rotating about the central axis.

4. The apparatus of claim 1, further comprising:
   support columns disposed on both sides of the cylinder body; and
   fixers penetrating the support columns to fix the cylinder body by pressing both sides of the cylinder body.

5. The apparatus of claim 4, wherein each of the support columns comprises a guide formed in a direction perpendicular to a ground, and
   the fixers are each configured to slide along the guide.

6. The apparatus of claim 5, wherein the cutter is disposed below the cylinder head, and
   the cylinder head is configured to move downward to reach the cutter.

7. The apparatus of claim 1, wherein the cylinder body comprises:
   a first portion having a columnar shape and comprising two planar portions facing each other; and
   a second portion having a cylindrical shape and being connected to the first portion.

8. The apparatus of claim 7, wherein the second portion and the cylinder head are threadedly engageable with each other.

9. The apparatus of claim 1, wherein the piston comprises an indicator configured to indicate an amount of high-viscosity fluid in the cylinder body.

10. The apparatus of claim 1, wherein the cooler comprises a cooling box disposed between the cylinder head and the cutter.

11. The apparatus of claim 1, wherein the cooler comprises a cooling hose configured to enclose the cylinder head.

12. An apparatus for quantitively supplying a high-viscosity fluid sample, the apparatus comprising:
    a cylinder body in which a high-viscosity fluid is to be stored;
    a cylinder head detachably attached to the cylinder body;
    a piston configured to slide in a longitudinal direction of the cylinder body; and
    a cooler disposed below the cylinder head and configured to cool a high-viscosity fluid discharged from the cylinder head.

13. The apparatus of claim 12, wherein the cooler comprises a cooling box disposed between the cylinder head and the cutter.

14. The apparatus of claim 12, wherein the cooler comprises a cooling hose configured to enclose the cylinder head.

* * * * *